United States Patent [19]
Olsen et al.

[11] 3,724,928
[45] Apr. 3, 1973

[54] MANUALLY OPERATED REMOTE CONTROL TRUCK MIRROR

[75] Inventors: Harry C. Olsen, Farmington; Ludwig J. Tischler, Huntington Woods; Heinz C. Wernecke, Southfield, all of Mich.

[73] Assignee: F. L. Jacobs Co., Southfield, Mich.

[22] Filed: Nov. 30, 1971

[21] Appl. No.: 203,128

[52] U.S. Cl. ..............................350/289, 74/501 M
[51] Int. Cl. ................................................G02b 5/08
[58] Field of Search .....74/501 M; 350/289, 288, 307

[56] References Cited

UNITED STATES PATENTS 3,277,678   10/1966   Booth..........................350/289 UX Primary Examiner—David Schonberg
Assistant Examiner—Michael J. Tokar
Attorney—Charles R. Rutherford

[57] ABSTRACT

A rear view mirror assembly for mounting on the side of a vehicle is provided. The assembly includes upper and lower support arms secured to the vehicle. A mirror is attached to the support arms by means of upper and lower support structures. The support structures each include pivotal means for pivotal mounting of the mirror. One of the support structures serves the dual purpose of securing the mirror to a support arm and housing an actuating mechanism for powered mirror adjustment from a remote location. A flexible shaft extends from the actuating mechanism to the interior of a vehicle cab for manual rotation of the mirror at a remote location.

1 Claim, 5 Drawing Figures

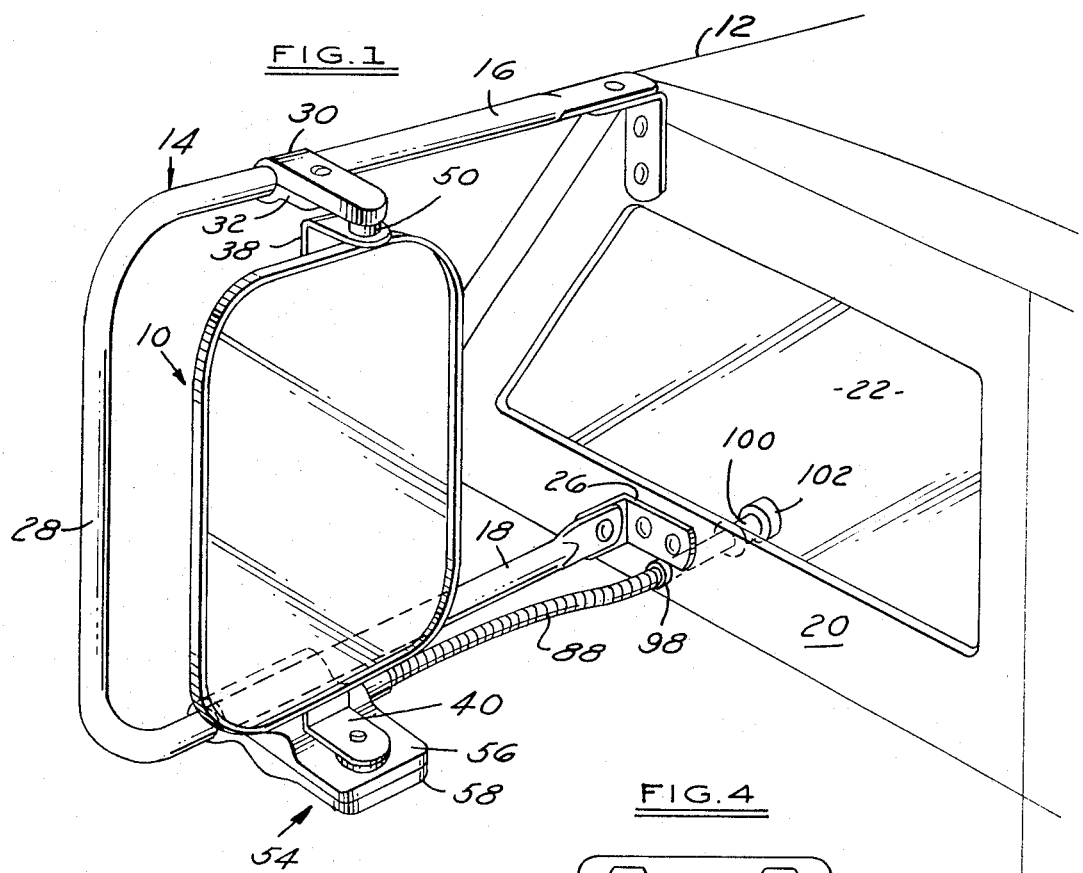
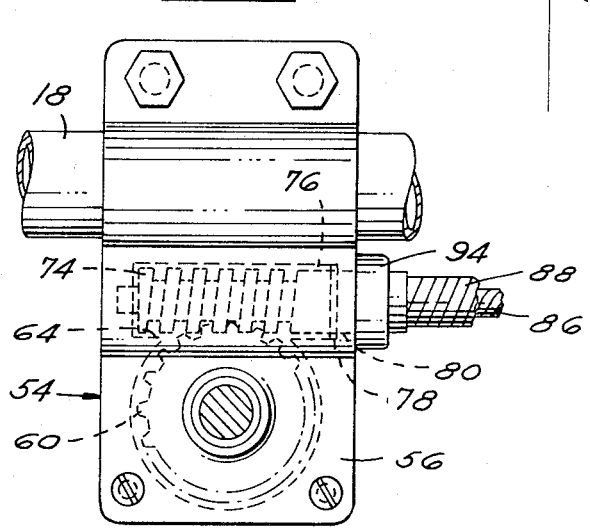

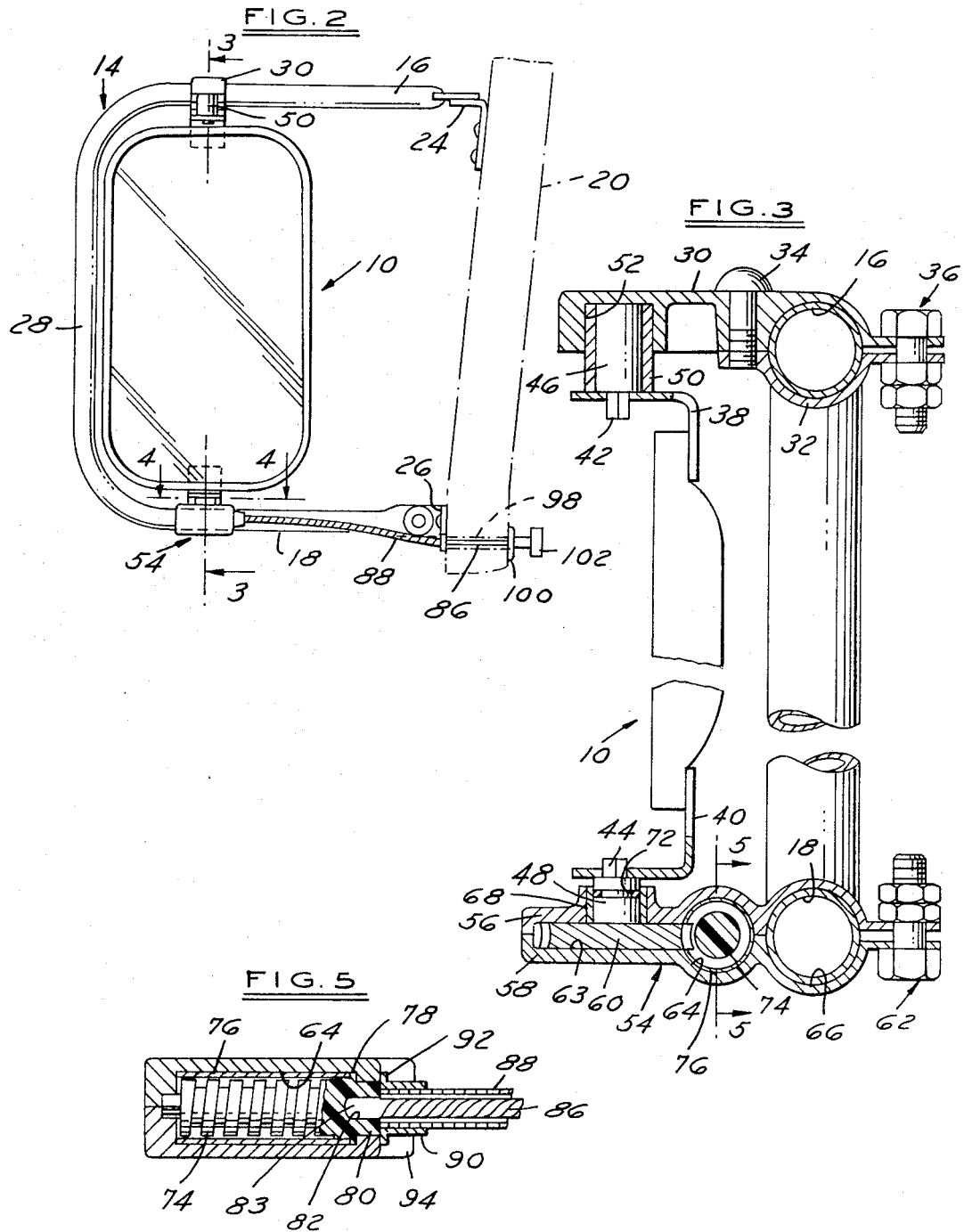

3,724,928

MANUALLY OPERATED REMOTE CONTROL TRUCK MIRROR

BACKGROUND OF THE INVENTION

The types of mirror assemblies to which the present invention relates are those commonly used on large vehicles, such as trucks, buses, and automobiles which pull trailers. Normally, one such mirror is provided on each side of the driver's compartment so that the driver will have a field of vision along both sides of the unit behind the driving compartment. Each mirror is located at a considerable distance outwardly from the side of the vehicle. It is difficult for the driver to manually adjust the mirrors as needed. Consequently, a need has been expressed for remotely controlled adjusting means including actuating means easily accessible to the driver for making adjustments to the mirrors while he is within the vehicle. Remotely adjustable mirrors similar to that presently proposed are disclosed in, for example, U.S. Pat. Nos. 2,860,546, 3,277,678 and 3,537,778. A flexible cable for remotely operating a worm as in the present invention is disclosed in U.S. Pat. No. 3,392,488.

Applicants have provided, in the present invention, what is submitted to be an improvement over such prior art structures. Applicants have provided a remotely controlled mirror which utilizes a minimum of components to result in a low final cost. This has been accomplished in part by combining actuating housing with mounting means to avoid separate components in this aspect of the structure. Further, the parts are so designed as to be easily manufactured by modern production machine tools. Additionally, the structure is adapted to promote quick and accurate assembly permitting the unit to be mounted in the field by one inexperienced in assembly of such mechanisms.

SUMMARY OF THE INVENTION

The rear view mirror assembly is for mounting on the side of a vehicle. The assembly comprises upper and lower support arms which are securable to a vehicle. A mirror and upper and lower mirror support structures are secured to the support arms. The mirror support structures each include pivotal means pivotally connecting the mirror at two spaced apart locations to the support arms. One of the mirror support structures includes a housing portion. An actuating mechanism for powered mirror adjustment from a remote location is received in the housing portion. Said one mirror support structure comprises separable upper and lower members. These members have opposed faces. A recess structure is provided in the opposed faces to define, upon fastening of said members together, a cylindrical cavity to receive a worm gear, a cylindrical cavity to receive a worm in engagement with the worm gear and a cylindrical cavity to clamp onto one of the support arms. Fastening means are provided to secure these mirror support structure members together. The worm gear, the worm and a support arm are received and clamped respectively in these cavities. Said one mirror support structure includes a first opening in axial alignment with the worm. A flexible shaft is provided with one end thereof extending through the first opening into engagement with the worm for rotating the worm. The flexible shaft is elongated for extension into a vehicle. Manually engageable means are provided at the other end of the flexible shaft for manual rotation of the shaft. Said one mirror support structure also includes a second opening in axial alignment with the worm gear. the pivotal means extends through this second opening and interconnects the worm gear and mirror for conjoint rotation.

IN THE DRAWINGS:

FIG. 1 is a view in perspective of a manually operated remote control vehicle mirror forming one embodiment of the present invention illustratively mounted on the door of a vehicle cab;

FIG. 2 is a front elevational view of the mirror as mounted on a vehicle;

FIG. 3 is a sectional view taken substantially along the line 3—3 of FIG. 2 looking in the direction of the arrows;

FIG. 4 is a sectional view taken substantially along the line 4—4 of FIG. 2 looking in the direction of the arrows; and FIG. 5 is a sectional view taken substantially along the line 5—5 of FIG. 3 looking in the direction of the arrows.

Referring to the drawings, the mirror 10 is of the type mounted on a large vehicle such as a bus or truck 12. The mirror 10 includes a frame and the usual reflecting glass. The mirror is generally rectangular in shape and is elongated in the vertical direction to present a large field of view. The mirror 10 is pivotally mounted on a U-shaped tubular support structure 14. The support structure 14 includes upper and lower horizontally extending arms 16, 18 which are secured to the vehicle door 20 adjacent the vehicle window 22 by means of brackets 24, 26. The arms 16, 18 are interconnected at the other end thereof by a vertically extending tubular web portion 28.

The upper end of the mirror 10 is pivotally connected to the tubular arm 16 by means of a bracket structure which includes separable portions 30, 32. The portion 30 has, at one end, an elongated semi-cylindrical recess which matches a similar semi-cylindrical recess on the portion 32. The recesses fit around the leg 16. The bracket portions are secured together by means of a screw 34 and nut and bolt structure 36 to thereby secure the bracket in place.

The mirror 10 includes upper and lower L-shaped brackets 38, 40 having horizontal portions which extend forwardly. A square hole is provided in each bracket to receive projections 42, 44 which are square in cross-section. The projections extend downwardly and upwardly from upper pivot shaft 46 and lower pivot shaft 48. The upper pivot shaft 46 extends rotatably into a bushing 50 which is received in a cylindrical recess 52 provided in portion 39 of bracket element 30.

The lower end of the mirror is pivotally mounted in a mirror support structure 54 which serves the combined purpose of a mounting bracket and housing for actuating mechanism. The structure 54 includes upper and lower separable members 56, 58. These members have mating recesses which, when the housing members are secured together by means of nut and bolt structure 62, define a cylindrical cavity 63 having a vertical axis and a pair of aligned cylindrical cavities 64, 66 having horizontally extending axes. A worm gear 60 is received in the cavity 63. The pivot shaft 48 is integral with the gear 60 and extends upwardly whereby the projection 44 extends through the opening in the mirror bracket 40 to thereby complete the pivotal mounting of the mirror 10. A bushing 68 is provided around the shaft 48 to journal the shaft. An annular groove is provided in the upper portion of the shaft 48. An O-ring 72 is received in the groove to thereby seal this opening in the structure 54 and protect the interior thereof from the ambient atmosphere.

As will be noted in FIG. 3, 4 and 5, a worm 74 is received in the cavity 64. A bushing 76 surrounds the worm to rotatably journal the worm in place. A flange 78 is provided at one end of the worm 74 to properly position the worm. The worm has a portion 80 of reduced diameter which extends through an opening in the housing at the end of the cavity 64. The portion 80 has a slot 82 to receive a key-like element 83 which is clamped to one end of a flexible steel shaft 86 which is formed of twisted steel fibers. The flexible shaft 86 extends from the structure 54 through the vehicle door 20. A flexible steel sheath 88 is provided around the shaft 86 to protect the shaft and form a guideway therefor. As will be noted, the inner diameter of the sheath 88 is somewhat larger than the outer diameter of the shaft 86 to permit free rotation of the shaft. A fitting 90 having a flange 92 is crimped to the end of the sheath 88. The structure 54 is provided with a projection 94 having an interior cavity in the shape of the fitting 90. The fitting 90 is received therein with the flanges being engaged to thereby secure the two structures together.

The other end of the shaft structure extends to the vehicle door 20. A cylindrical tubular member 98 extends through the width of the door. The shaft structure extends through the member 98 and is secured at the other end by means of a fitting 100. A knob 102 is provided on the interior of the vehicle cab and is secured to the flexible shaft 86 to permit turning of the shaft 86 from the interior of the vehicle.

The structure 54 is secured to the lower arm 18 of the support 14 as a result of the cavity 66 surrounding this arm upon assembly of the housing. The housing thus serves the dual purpose of a mounting bracket and a receptacle for the actuating structure.

In fabricating the various components of the assembly, the bushings are preferably made of bronze, the worm is preferably fabricated of nylon, and the housing and bracket components along with the worm gear 74 are preferably of zinc.

Operation of the mirror assembly may now be understood. The mirror is firmly mounted for pivotal engagement between the upper and lower pivot shafts 46, 48. The driver of the vehicle must merely turn the knob 102 to cause turning of the flexible shaft 86. Turning of the shaft 86 results in the key-like element 83 rotating the worm 74. The worm 74 engages the worm gear 60 and results in rotating of the gear 60. The gear 60 has the pivot shaft 48 integral therewith. Rotation of the pivot shaft 48 along with the worm gear results in the projection 44 applying a turning force to the mirror bracket 40 resulting in turning of the mirror to the desired angular position.

What we claim is:

1. A rear view mirror assembly for mounting on the side of a vehicle comprising upper and lower support arms securable to a vehicle, a mirror, upper and lower mirror support structures each including pivotal means pivotally connecting said mirror at two spaced apart locations to the support arms, one of said mirror support structures including a housing portion, an actuating mechanism for powered mirror adjustment from a remote location received in said housing portion, said one mirror support structure comprising separable upper and lower mirror support structure members, said members having opposed faces, a recess structure in said opposed faces defining, upon fastening of said support structure members together, a cylindrical cavity to receive a worm gear, a cylindrical cavity to receive a worm in engagement with said worm gear and a cylindrical cavity to clamp onto one of said support arms, fastening means securing said mirror support structure members together, a worm gear, a worm and said one support arm being received and said one support arm being received and clamped respectively in said cavities, said one mirror support structure including a first opening in axial alignment with the worm, a flexible shaft, one end of said flexible shaft extending through said first opening into engagement with said worm for rotating the worm, said flexible shaft being elongated for extension into a vehicle, manually engageable means at the other end of said flexible shaft for manual rotation thereof, said one support structure including a second opening in axial alignment with the worm gear, said pivotal means extending through said second opening and positively interconnecting the worm gear and mirror for conjoint pivotal movement, said last mentioned pivotal means extending through said second opening comprising a cylindrical pivot shaft, said pivot shaft having an annular groove in the outer periphery thereof, an annular sealing member in said groove, and a bushing in said second opening around said pivot shaft in sealing rotative engagement with said annular sealing member.

* * * * *